United States Patent

[11] 3,583,581

| | | |
|---|---|---|
| [72] | Inventor | Everett Lavern Myers<br>Horicon, Wis. |
| [21] | Appl. No. | 840,361 |
| [22] | Filed | July 9, 1969 |
| [45] | Patented | June 8, 1971 |
| [73] | Assignee | Deere & Company<br>Moline, Ill. |

[54] STACKING STAND
15 Claims, 4 Drawing Figs.

[52] U.S. Cl. ........................................................ 214/10.5R,
105/368R, 211/13
[51] Int. Cl. .................................................................. B65g 1/16
[50] Field of Search .......................................... 214/10.5;
105/368; 211/13, 17

[56] References Cited
UNITED STATES PATENTS
1,202,912  10/1916  Souther ............................  105/368

| | | | |
|---|---|---|---|
| 2,906,405 | 9/1959 | Erickson .................... | 105/368UX |
| 2,968,260 | 1/1961 | Scheldrup .................... | 105/215(C) |

FOREIGN PATENTS
573,060  12/1958  Belgium ........................  214/10.5

Primary Examiner—Gerald M. Forlenza
Assistant Examiner—Frank E. Werner
Attorneys—H. Vincent Harsha, Harold M. Knoth, William A. Murray, John M. Nolan and Raymond L. Hollister ABSTRACT: A stacking stand for lawn and garden tractors which includes a pair of end frames and pairs of lift members and tie bars extending between the frames. The lift members and tie bars are secured to the end frames by releasable pin and aperture connections. The lift members are adapted to extend under the rear axle housing of the tractor and be connected to a forward portion of the tractor by pin and aperture connections. The upper ends of the legs of the end frames are provided with socket means adapted to receive the lower ends of the legs of another stand.

PATENTED JUN 8 1971 3,583,581

INVENTOR.
E. L. MYERS

INVENTOR.
E. L. MYERS

STACKING STAND

BACKGROUND OF THE INVENTION

The present invention relates generally to stacking stands and more particularly relates to knockdown stacking stands for lawn and garden tractors.

When storing and shipping lawn and garden tractors, it has previously been accepted practice by the manufacturers to crate the tractors in wood and cardboard cartons. The cartons would protect the tractors from damage and would permit stacking of the tractors. However, since each carton completely encloses the tractor, it was of a cumbersome size which made it difficult to handle and limited the number of tractors which could be stacked on top of each other within a given vertical clearance. Also, the wood and cardboard cartons were not reusable and hence resulted in a waste of material which increased shipping costs.

SUMMARY OF THE INVENTION

An object of the present invention is to provide stacking stands for lawn and garden tractors which permit the tractors to be vertically stacked in a minimum of space by positioning the tractors in overlapping relationship with an upper portion of the lower tractor contained within the confines of a lower portion of the upper tractor.

Another object of the present invention is to provide reusable shipping stands for lawn garden tractors.

Still another object of the invention is to provide stacking stands for lawn and garden tractors which can be conveniently handled by the forks of a forklift truck without the use of pellets and which permit the forks to be positioned from either side or end of the stand. In addition, the stacking stands according to the invention can also be conveniently handled by a hoisting device.

Yet another object of the invention is to provide a knockdown stacking stand for lawn and garden tractors which can be easily assembled and disassembled without the use of tools and with a minimum of time and efforts.

A still further object of the invention is to provide a shipping stand for lawn and garden tractors which can accommodate various sizes of tractors.

The above objects are accomplished by providing a stand having a pair of end frames and pairs of lift members and tie bars extending between the end frames. The lift members and tie bars are secured to the end frames by releasable pin and aperture connections. The lift members are adapted to extend under the rear axle housing of a tractor and be connected to a lower forward portion of the tractor by a pin and aperture connection. The upper ends of the legs of the end frames are provided with socket means which will receive the lower ends of the legs of another stand has a height less so that the stands can be vertically stacked. Each stand has a height less than the tractor with which it is used so that when the stands are stacked on top of each other, the upper portion of the lower tractor, for example, the seat, steering wheel and hood, are positioned between the wheels of the upper tractor.

The invention also encompasses the use of a top frame for the stand, the top frame including legs which will extend into the sockets on the upper ends of the end frames. The top frame protects the tractor and can be used to carry attachments for the tractor during shipment. This top frame also protects the tractor and enables the use of a carton if so desired for LTL shipments.

The above and additional objects and advantages will become apparent along with the details of construction of a preferred embodiment of the invention from a reading of the following description when taken in conjunction with the accompanying drawings.

DESCRIPTION OF THE PREFERRED EMBODIMENT

Figure 1:
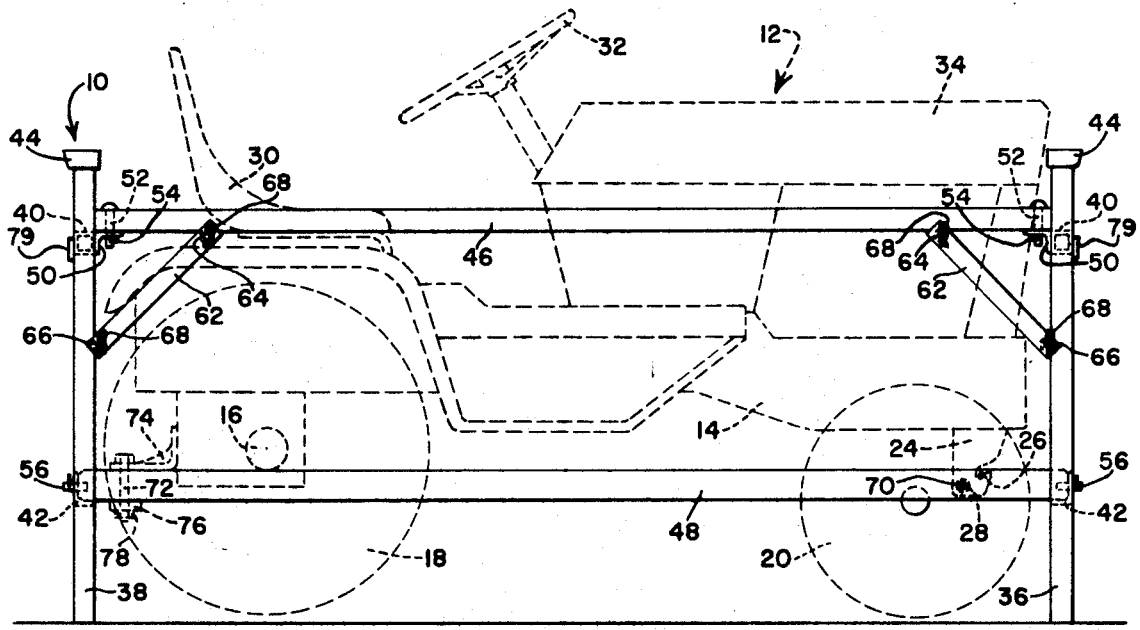
FIG. 1 is a side elevational view of a shipping stand according to the present invention, a tractor being shown in phantom to illustrate its relationship with the stand.
Figure 2:
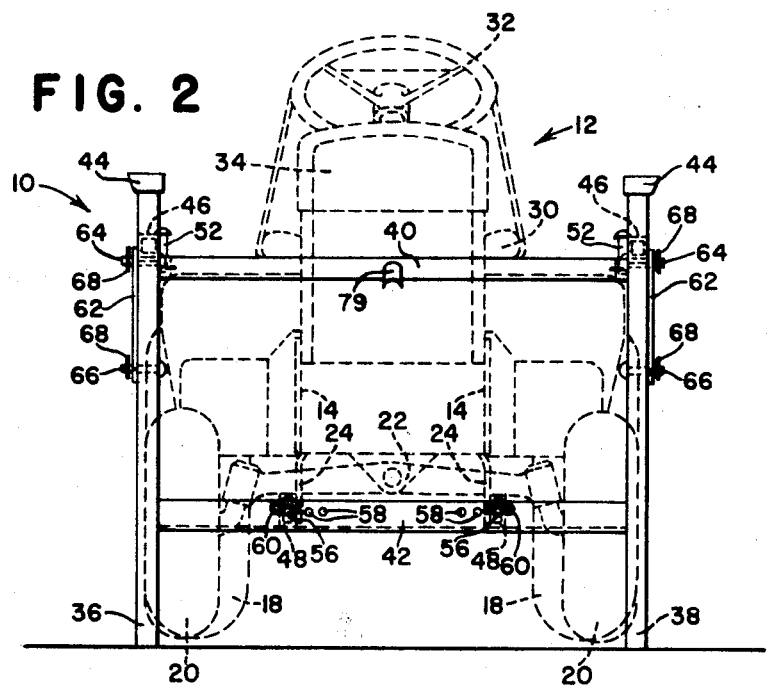
FIG. 2 is a front elevational view of the stand and tractor illustrated in FIG. 1.

Referring now to the drawings, a stacking stand according to the present invention is indicated generally at 10 and is illustrated as carrying a conventional tractor shown in phantom and indicated generally by the numeral 12. The tractor 12 will first be briefly described to set forth a background for a better understanding of the invention. The tractor 12 is of the type commonly referred to as lawn and garden tractors and includes a chassis consisting of longitudinally extending frame members 14. The frame members 14 carry a transversely extending rear axle housing 16 which supports the tractor on ground-engaging wheels 18. The forward portion of the tractor is supported by wheels 20 mounted on a transversely extending axle 22 which is pivotally mounted to any suitable portion of the tractor chassis. A pair of mounting brackets 24 are mounted on and depend from the forward portion of the frame members 14 for the purpose of securing various implements to the tractor. For the purpose of attaching implements, the mounting brackets 24 are provided with forwardly open slots 26 and apertures 28 positioned rearwardly of and slightly below the slots 26. The tractor 12 also includes the conventional seat 30, steering wheel 32, and forward hood 34.

The stand 10 includes front and rear end frames which are identical to each other and each of which includes a pair of legs 36 and 38 and upper and lower frame members 40 and 42, respectively, which interconnect the legs 36 and 38. Each of the legs 36 and 38 is of rectangular tubular construction and has a cup or socket means 44 mounted on its upper end. The socket means 44 will be more fully described hereinafter. The upper frame member 40 is also of rectangular tubular construction and has its opposite ends secured to the legs 36 and 38 near the upper ends thereof in any suitable manner such as welding. The lower frame member 42 is of right angle construction, has its opposite ends secured to the legs 36 and 38, and is oriented to provide generally horizontal and vertical surfaces.

The end frames are adapted to be interconnected by a pair of upper tie bars 46 and a pair of lower lift members 48. The tie bars 46 are of rectangular tubular construction, extend between the legs of the end frames, and rest on the top of brackets 50 secured to the end legs 36 and 38 in any suitable manner. The brackets 50 have a width greater than the width of the legs 36 and 38, and the portion of the brackets 50 which extend to the sides of the legs 36 and 38 are apertured. Retaining pins 52 are secured to a side surface of the tie bars 46 adjacent the ends thereof and are adapted to extend through the apertures provided in the brackets 50 when the tie bars 46 are placed on top of the brackets 50. The pins 52 are releasably retained within the apertures provided in brackets 50 by spring clip pins 54. The lift members 48 are also of rectangular tubular construction, extend between the end frames, and have their opposite ends resting on the horizontal surfaces provided by the lower frame members 42. The lift members 48 are provided with pin tenons 56 projecting from the ends thereof and which are adapted to extend through apertures 58 provided in the lower frame members 42. The lower frame members 42 are provided with a plurality of the apertures 58 for each lift member for a reason which will become apparent hereinafter. The pins 56 are retained within the apertures 58 in any suitable manner such as spring clip pins 60.

To lend rigidity to the stand, the tie bars 46 and legs 36 and 38 of the end frames are also connected together by brace straps 62. Each of the brace straps 62 is apertured at its opposite ends, with one end adapted to be mounted on a pin 64 welded to and extending from one side of the tie bar 46 and the opposite end adapted to be mounted on a pin 66 welded on and extending from one side of one of the legs 36 and 38. The straps 62 are releasably retained on the pins 64 and 66 by spring clip pins 68. When the stand is disassembled, the straps 62 will normally be left secured to the tie bars 46, it being efficient to detach them from the end stands only.

To mount a tractor on the stand, the lift members 48 are positioned under the tractor with the rear portions thereof extending beneath the rear axle housing 16. The forward portions of the lift members 48 are provided with transversely extending mounting pins 70 which are inserted through the apertures 28 provided in the mounting brackets 24. The lift members 48 are then mounted on the lower frame members 42 by inserting the pins 56 through the apertures 58. When the lift members 48 are mounted on the lower frame members 42, the rear portion of the lift members engaging the rear axle housing 16 carry the rear end portion of the tractor and the pins 70 engaging the upper edges of the slots 28 carry the forward portion of the tractor. The tie bars 46 are then connected to the legs 36 and 38 by inserting the pins 52 through the apertures provided in brackets 50. The stand is then completed by connecting the brace straps 62 to the legs 36 and 38 by placing the apertured ends of the brace straps 62 over the pins 66. The various components of the stacking stand are releasably secured together by the spring clip pins.

The mounting pins 70 in addition to serving as a support for the forward portion of the tractor also hold the tractor against longitudinally sliding movement on the lift members 48 so that the tractor cannot engage the end frames of the stand. Generally, the weight of the tractor is sufficient to maintain the same securely against the lift members 48 so it will not bounce around on the stand during transportation, but if it is desired to have a more positive connection between the tractor and lift members, it is simply accomplished by extending a bolt 72 through the tractor drawbar 74 and through a board 76 positioned under the lift members 48. By tightening a nut 78 on the bolt 72, the lift members 48 are clamped between the rear axle housing 16 and board 76.

As previously mentioned, each of the lower frame members 42 is provided with a plurality of apertures 58 for the reception of the pins 56 on the ends of the lift members 48. The plurality of apertures permit the lift members 48 to be positioned according to the spacing between the mounting brackets 24 so that the stand can accommodate a number of different sizes of tractors. For example, stands of a single size can be used to ship any tractors within the 6—14 horsepower range.

Since the lift members 48 and lower frame members 42 are positioned well above the lower ends of the legs 36 and 38, the stand 10 is easily handled by the forks of the forklift truck. For example, the forks can be positioned under the lift members 48 from either side of the stand or can be positioned under the lower frame members 42 from either end of the stand. Thus, the stands are easily placed on the bed of a truck or stacked within a warehouse. For the purpose of handling the stands in an area where a forklift truck in not available, positioner members 79 are secured to the upper frame members 40. Positioner members 79 are used to center and contain hooks on a hoisting device.

Figure 3:
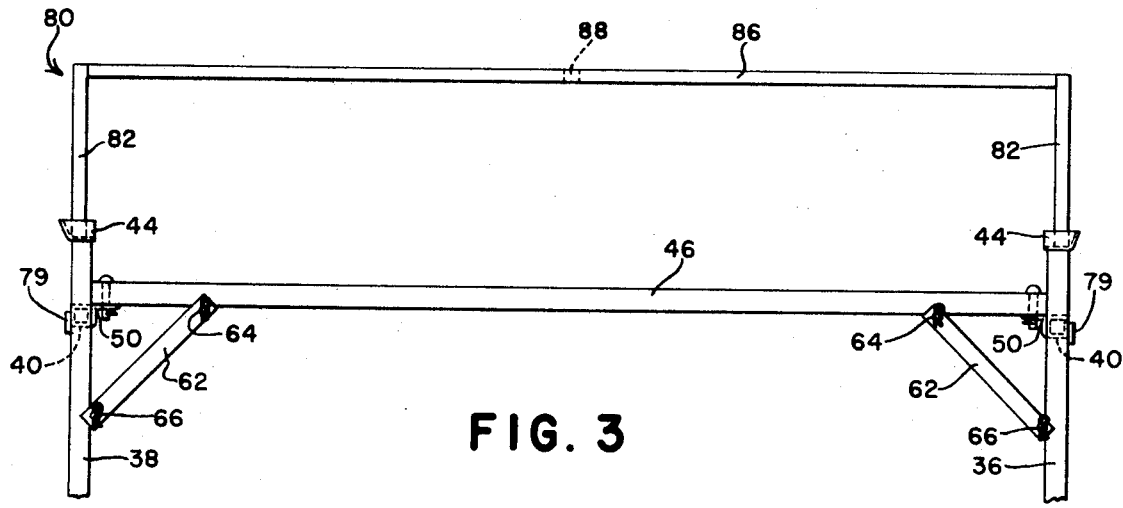
FIG. 3 is a side elevational view of the upper portion of the stand illustrated in FIG. 1, and further showing a top frame mounted on the stand.
Figure 4:
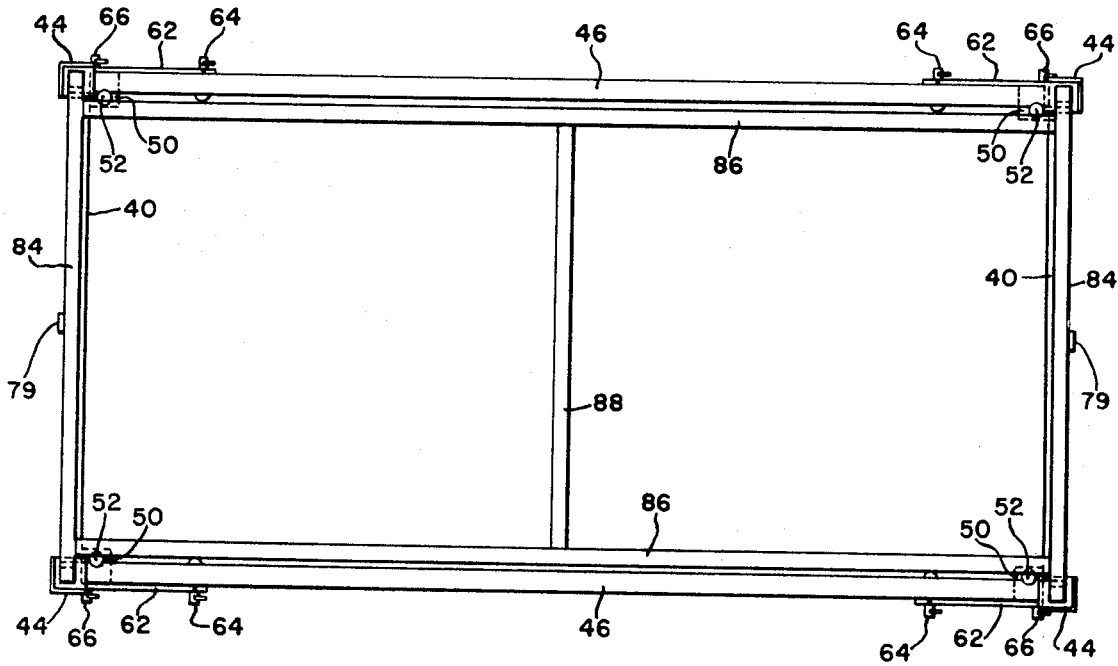
FIG. 4 is a top plan view of the structure illustrated in FIG. 3.

The cup or socket members 44 on the upper ends of the legs 36 and 38 of the end frames are for the purpose of stacking the stands or, in the alternative, for receiving a top frame such as that illustrated in FIGS. 3 and 4 and indicated generally by the numeral 80. Each of the socket means 44 includes a bottom wall which is secured to the upper end of a leg in any suitable manner such as welding, a sidewall and an end wall. The end walls of the socket means 44 are slanted from the true vertical and act as a guide for the lower ends of the legs of another stand or of the top frame 80. Since the stands 10 are substantially rigid when assembled, it is only necessary for each of the socket means to have an end wall and a single sidewall to prevent movement of the upper stand or top frame.

The top frame 80 illustrated in FIGS. 3 and 4 includes a pair of inverted generally U-shaped end members each of which includes a pair of legs 82 and a bight portion 84. The end members of the top frame are interconnected by elongated frame members 86 which extend between the bight portions 84 of the end members and are rigidly secured thereto in any suitable manner such as welding. The frame members 86 are interconnected intermediate their ends by a crossbar 88 which serves to reinforce the frame members 86. The top frame 80 serves a twofold purpose. First, the top frame 80 can be used to carry attachments for the tractor carried by the stand 10 and secondly, will provide a tractor carried by the stand 10 some protection from falling objects both during shipment and during storage within a warehouse.

While only a single preferred embodiment of the invention has been described and illustrated, various modifications thereof will become obvious to those skilled in the art and can be made without departing from the underlying principles of the invention.

I claim:

1. A knockdown stacking stand adapted to carry a lawn and garden tractor of the type having an elongated chassis carrying a transversely extending axle housing adjacent the rear end thereof and a pair of transversely spaced mounting brackets adjacent the forward end thereof with each of the brackets being provided with a transversely open aperture, the stand comprising: a pair of end frames adapted to be positioned at opposite ends of the tractor; each end frame including a pair of transversely spaced generally vertical legs and a pair of vertically spaced generally horizontal frame members interconnecting the legs remotely from the lower ends thereof; a pair of elongated lift members extending between the end frames; the lift members being adapted to be positioned under the axle housing and alongside the mounting brackets of the tractor; transversely extending pin means carried at one side of each lift member and adapted to extend through the apertures in the mounting brackets; means for releasably connecting the ends of the lift members to the lower frame members; a pair of tie bars extending between the legs of the pair of end frames adjacent the upper ends thereof; and means for releasably connecting the ends of the tie bars to the legs of the end frames.

2. The stand set forth in claim 1 wherein each leg of the end frames carries an upwardly open socket member at the upper end thereof.

3. The stand set forth in claim 1 wherein the means for releasably securing the lift members to the lower frame members includes apertures provided in the lower frame members, the apertures being spaced from the legs of the frame and from each other, and pin means on each of the lift members adapted to be inserted through the apertures.

4. The stand set forth in claim 3 wherein the means for releasably connecting the ends of the tie bars to the legs of the the frames includes a bracket having a generally horizontal leg secured to each of the legs, the horizontal leg of each bracket being provide with an aperture, and pin means carried at the ends of each tie bar and extending generally transversely the length thereof; the tie bars adapted to be positioned on top of the brackets with the pin means extending through the apertures.

5. The stand set forth in claim 4 wherein the lower frame members are provided with a plurality of apertures whereby the stand can be used to carry different sizes of tractors having varying spacings between the mounting brackets.

6. The stand set forth in claim 5 further including a brace member extending between each leg and the corresponding tie bar; the brace members being releasably secured to the legs and tie bars.

7. The stand set forth in claim 5 wherein each of the legs of the end frames is provided with an upwardly open socket means at its upper end adapted to receive the lower ends of the legs of a corresponding frame whereby a plurality of the stands can be vertically stacked.

8. The stand set forth in claim 5 wherein each of the legs of the end frames is provided with an upwardly open socket means at its upper end, and the stand further includes a top frame adapted to be positioned over a tractor carried by the stand; the top frame including a pair of inverted U-shaped members, the legs of each U-shaped member adapted to be received by the sockets on one of the end frames, and tie bar means rigidly interconnecting the U-shaped members.

9. The stand set forth in claim 8 wherein the tie bar means extend between the bight portions of the U-shaped members, and at least one brace member interconnects the tie bar means intermediate the ends thereof.

10. A stacking stand adapted to carry a lawn and garden tractor of 13 type having a transversely extending rear axle housing, the stand comprising: a pair of end frames adapted to be positioned at opposite ends of the tractor; each end frame including a pair of spaced generally vertical legs and a pair of vertically spaced generally horizontal frame members interconnecting the legs; a pair of independent elongated lift members extending between the end frames; the lift members being adapted to be positioned under the rear axle of the tractor; means for releasably securing each of the lift members adjacent one end thereof to the lower forward portion of the tractor; means for releasably securing the ends of the lift members to the end frames; a pair of tie bars extending between the legs of the pair of end frames adjacent the upper ends thereof; and means for releasably connecting the ends of the tie bars to the legs of the end frames.

11. The stacking stand set forth in claim 10 wherein the lift members are secured to the lower frame members.

12. The stacking stands set forth in claim 11 wherein the means for releasably securing the lift members to the lower frame members includes apertures provided in the flower frame members and pin tenon means carried at the ends of the lift members for insertion through the apertures.

13. The stacking stand set forth in claim 12 wherein there is a plurality of transversely spaced apertures provided in the lower frame member for each end of each lift member, whereby the stacking stand is adapted to carry various sizes of tractors.

14. The stand set forth in claim 10 wherein each of the legs of the end frames is provided with upwardly open socket means at the upper end, the socket means being adapted to receive the lower ends of the legs of a corresponding stand.

15. The stand set forth in claim 1. wherein each of the legs of the end frames is provided with upwardly open socket means at its upper end, and the stand further includes a top frame adapted to be carried in the socket means.

UNITED STATES PATENT OFFICE
CERTIFICATE OF CORRECTION

Patent No. 3,583,581          Dated 3 June 1971

Inventor(s) Everett Lavern Myers

It is certified that error appears in the above-identified patent and that said Letters Patent are hereby corrected as shown below:

Column 4, line 57, before "frames" change "the" to -- end --; line 59, change "provide" to -- provided --.

Column 5, line 17, change "13" to -- the --.

Column 6, line 10, change "flower" to -- lower --; line 20, change "the" (1st occ.) to -- its --; line 22, change "1" to -- 10 --.

Signed and sealed this 18th day of January 1972.

(SEAL)
Attest:

EDWARD M. FLETCHER, JR.          ROBERT GOTTSCHALK
Attesting Officer                Acting Commissioner of Patents